Oct. 2, 1923.
H. D. WILLIAMS
TOOTHED GEAR
Filed June 11, 1918   4 Sheets-Sheet 1
1,469,290
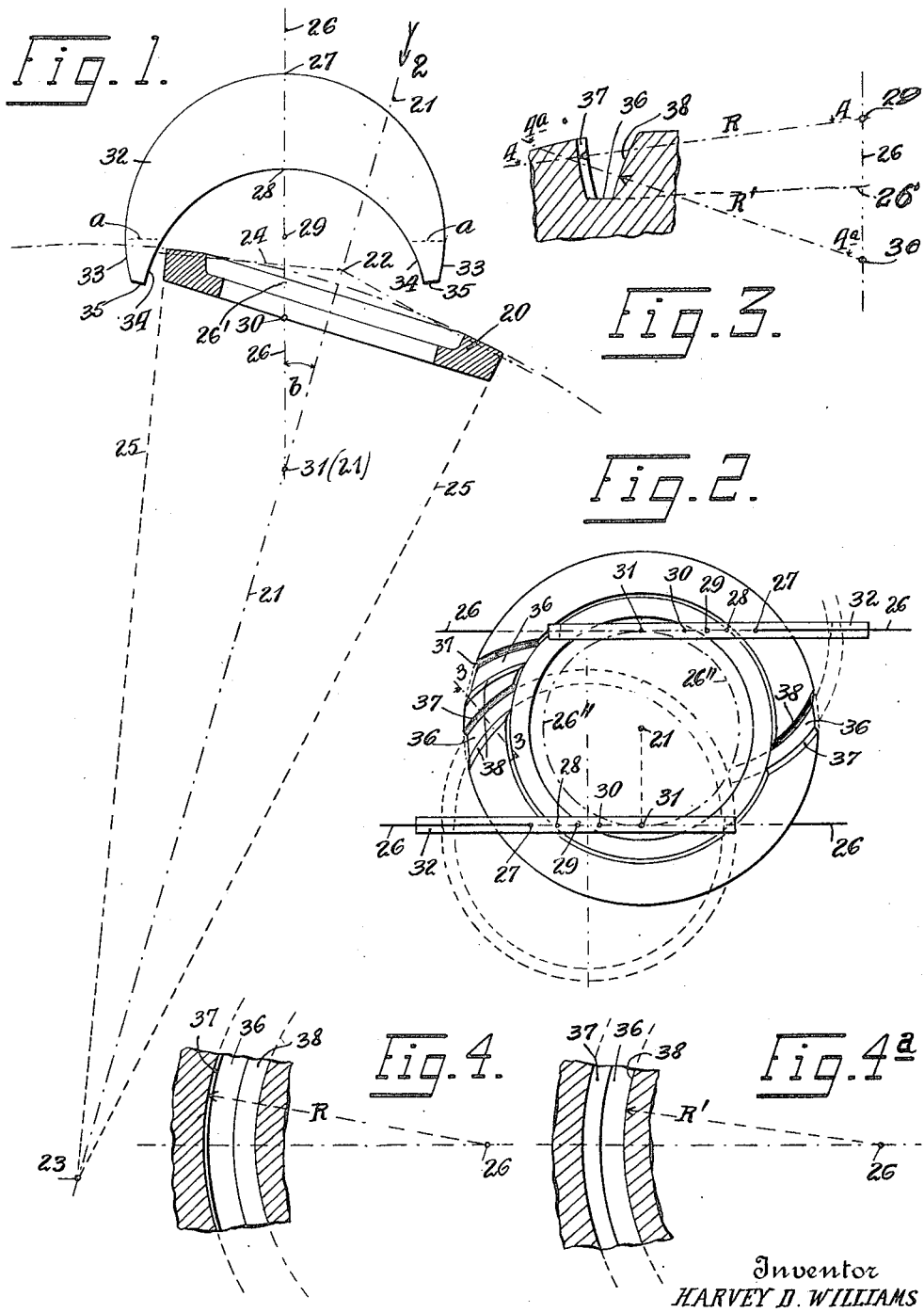
Inventor
HARVEY D. WILLIAMS
By his Attorney
John Lotka Oct. 2, 1923.  
H. D. WILLIAMS  
TOOTHED GEAR  
Filed June 11, 1918  
1,469,290  
4 Sheets-Sheet 2

Inventor  
HARVEY D. WILLIAMS  
By his Attorney  
John Louka

Oct. 2, 1923.
H. D. WILLIAMS
TOOTHED GEAR
Filed June 11, 1918
1,469,290
4 Sheets-Sheet 3
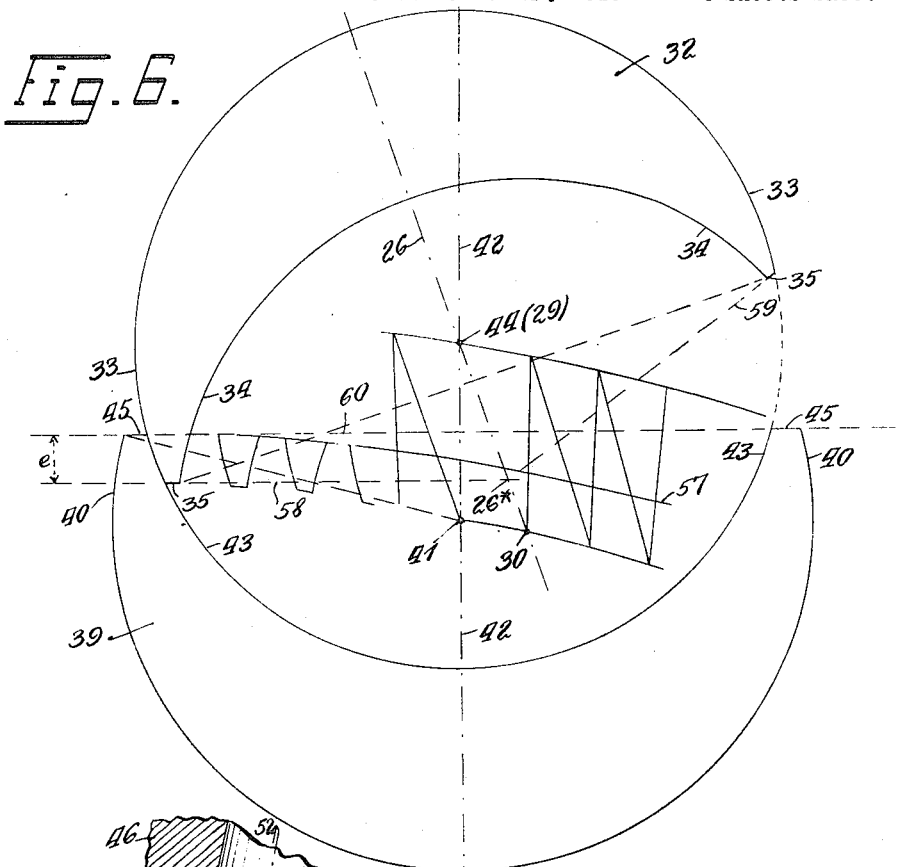
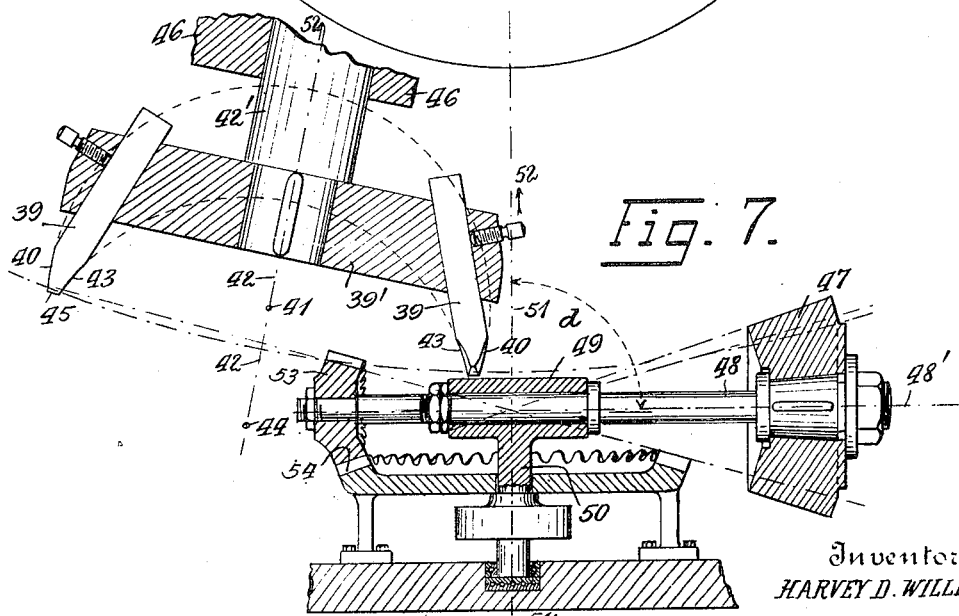
Inventor
HARVEY D. WILLIAMS
By his Attorney
John Lotka Oct. 2, 1923.
H. D. WILLIAMS
TOOTHED GEAR
Filed June 11, 1918    4 Sheets-Sheet 4
1,469,290
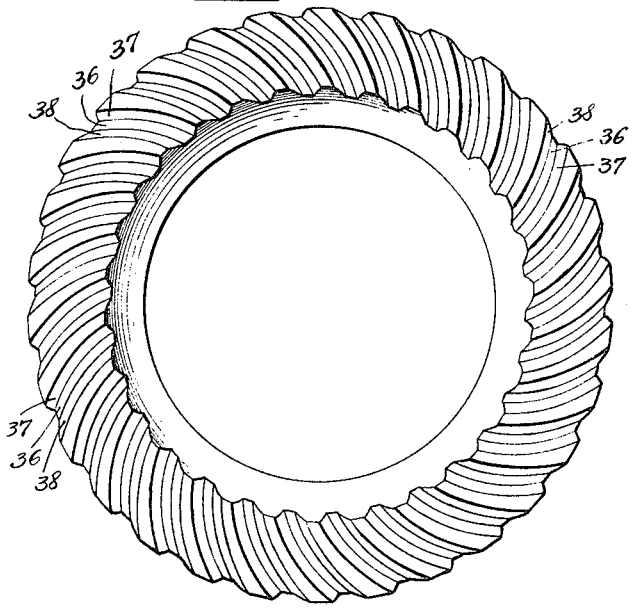
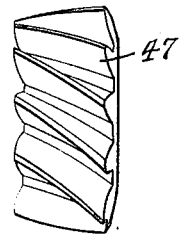
Inventor
HARVEY D. WILLIAMS
By his Attorney
John Lotka Patented Oct. 2, 1923.

1,469,290

UNITED STATES PATENT OFFICE.

HARVEY D. WILLIAMS, OF WALLINGFORD, CONNECTICUT, ASSIGNOR, BY MESNE ASSIGNMENTS, TO SECURITY TRUST COMPANY, OF DETROIT, MICHIGAN, A CORPORATION OF MICHIGAN.

TOOTHED GEAR.

Application filed June 11, 1918. Serial No. 239,354.

*To all whom it may concern:*

Be it known that I, HARVEY D. WILLIAMS, a citizen of the United States, and resident of Wallingford, in the county of New Haven and State of Connecticut, have invented certain new and useful Improvements in Toothed Gears, of which the following is a specification.

My present invention relates to toothed gears, and has for its object to provide a highly efficient system of meshing gears having active tooth-surfaces of a novel formation which will insure their proper engagement and smooth running, together with other advantages which will be fully set forth in the description following hereinafter.

The gears to which my present invention relates are of the type in which the two meshing gears are of different kinds, one of such gears (generally the larger one) having its active tooth surfaces conformed to a so-called single-reproduction configuration, that is to say, a shape such as can be described by a simple motion of a suitable tool relatively to a stationary blank, while the other gear (generally the smaller one) has its active tooth surfaces conformed to a compound-reproduction configuration, that is to say, a shape which requires a (rolling) movement of the blank relatively to the tool, in addition to the cutting motion of the tool. In my present invention, the active tooth-surfaces of the gear conformed to the single-reproduction configuration, are of preferably spherical curvature, and the successive surfaces are alternately convex and concave; that is to say, of the two surfaces on the same tooth, or of the two active surfaces bounding the same space, one is convex and the other concave. For the sake of simplicity and clearness, the gear having active tooth surfaces of single-reproduction configuration will hereinafter be referred to as the " wheel," and the other gear as the " pinion," without necessarily implying that the latter is the smaller of the two meshing gears. My invention is applicable to bevel gears and to spur gears as well.

Figure 5:
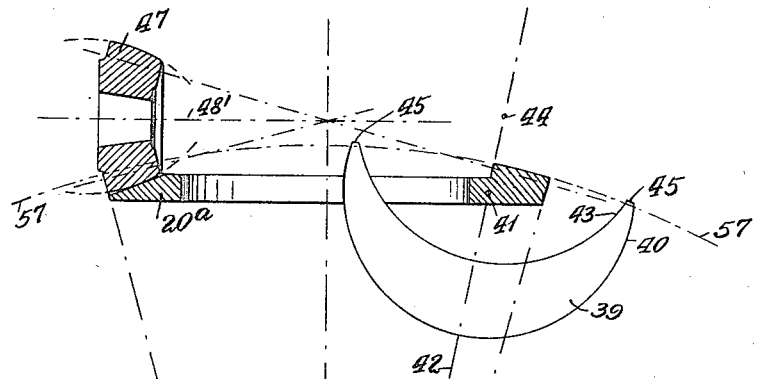
Figure 8:
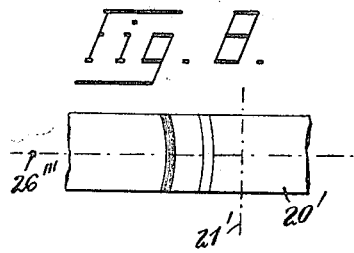
Figure 9:
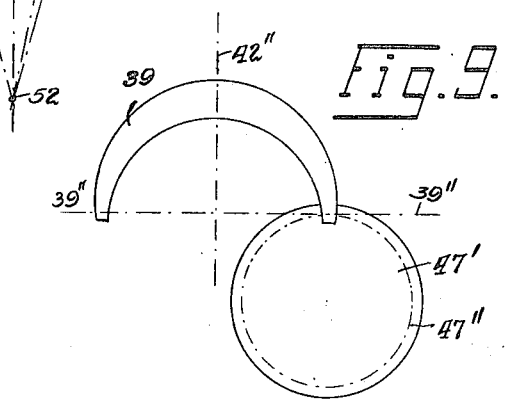

The principles and manner of carrying out my present invention will now be explained more fully with reference to the accompanying drawings, in which Fig. 1 is a diagrammatic view illustrating the manner of cutting the teeth on the gear defined above as the " wheel;" Fig. 2 is a view looking in the direction of the arrow 2 in Fig. 1; Fig. 3 is a detail transverse section showing two adjacent tooth-surfaces of said " wheel" and taken substantially in the plane indicated by the line 3—3 in Fig. 2; Figs. 4 and 4ª are longitudinal sections taken substantially in the planes indicated by the lines 4—4 and 4ª—4ª respectively of Fig. 3; Fig. 5 is a diagram showing the blanks for the " wheel " and for the " pinion " respectively, together with the tool for cutting the teeth of the pinion; Fig. 6 is a diagrammatic section, or developed view, illustrating certain relations between the cutters for the two gears; these Figs. 1 to 6 inclusive represent my invention as applied to bevel gears; Fig. 7 is a sectional elevation of a machine for cutting tooth surfaces on bevel pinions in accordance with my present invention; Fig. 8 is a diagrammatic view of a spur wheel having spherically-curved tooth surfaces in accordance with this invention; and Fig. 9 is a diagram of a machine for cutting on spur pinions, tooth surfaces to match those of the spur wheel indicated in Fig. 8; Figs. 10 and 11 are views showing complete wheels corresponding to the fragmentary showing of Figs. 2 and 8 respectively; and Figs. 12 and 13 are edge views of the corresponding pinions.

The rotary cutter illustrated herein is not claimed in this case, but in another application for Letters Patent of the United States filed by me September 14, 1916, Serial No. 120,087, which has resulted in the grant of Letters Patent No. 1,313,034 dated August 12, 1919.

Referring first to the construction of bevel gears according to my present invention, and particularly to a bevel "wheel" as shown in Figs. 1 to 4ª and 10, I have designated by 20 the blank on which the teeth are to be cut, the axis of said conical blank being shown at 21, with the apex 22 of the pitch cone located on said axis, as is also the apex 23 of the so-called back cone, those generatrices (such as 24, 25) of the said two cones which meet at the common base of said cones, being perpendicular to each other. The axis about which the cutter is adapted to turn, while the blank 20 remains stationary, is indicated at 26, and on said cutter axis I have designated successive points by the numerals 27, 28, 29, 30, and 31, the latter being the point at which the axis 26 comes closest to the axis 21; in other words, the line 21—31, the length of which appears from Fig. 2, is perpendicular to both axes 21 and 26. The cutter 32 which is adapted to turn about the said axis 26 (the latter, as shown, having a skew relation to the axis 21) comprises two edges adapted to cut the concave and convex tooth surfaces respectively, the former being indicated at 33 and having its convexity curved according to the arc of a circle the center of which, 29, lies on the axis 26 about which the tool turns. The other (concave) edge 34, which cuts the convex tooth surfaces, is curved according to the arc of a circle having its center 30 likewise upon said axis 26. Generally, the radius R of the arc 33 is made slightly larger than the radius R' of the arc 34, but I do not intend to restrict myself to any particular relation of these two radii, which in some cases might be equal. Of course, only the operative portions of the cutter° (say below the lines a in Fig. 1) need be made with the special conformation herein set forth, it being really immaterial what outline is given to the inactive portion of the cutter (above the lines a); for the sake of convenience in illustration and manufacture, the entire outline of the cutter 32, with the exception of the bottom face 35, has been indicated as conformed to circular arcs. The numerals 27, 28 indicate the points at which the axis 26 of the cutter shaft, emerges from the cutter. The bottom edge 35 is generally straight and may be either inclined to the axis 26 as in Figs. 1 and 6, or it might be perpendicular to said axis and so disposed that if extended it would pass through the axis 26 at 26' (Figs. 1 and 3).

When a cutter of the character set forth above is rotated about the axis 26, its edge 35, and the portions of its edges 33, 34 adjacent to said edge 35, or in other words, located on the "tip" of the cutter, will form on said blank three surfaces of different characteristics: First, a bottom surface 36, produced by the edge 35, and if the latter is arranged as first referred to above, said bottom surface 36 will be conical but plane (as indicated in Fig. 3) when the edge 35 is perpendicular to the axis 26; second, a concave surface 37 of spherical curvature, cut by the edge 33, said surface being part of a sphere the center of which is at 29; third, a convex surface 38, produced by the edge 34, and of spherical curvature, said surface being part of a sphere having its center at 30. Fig. 2 shows the location of the cuts which will be produced by the rotation of the tool 32. The blank 20 may have the tooth spaces formed preliminarily by casting or by a preparatory cutting operation intended to give the teeth an approximately correct form, in which case the cutter 32 would be simply a finishing cutter. However, if preferred, the cutter 32 may be employed to fashion the teeth from a solid blank (having no tooth spaces formed even roughly); in this case it will be desirable to give the cutter a gradual feed lengthwise of the axis 26 until the proper depth of cut is attained.

It will be seen that the cutter shown is really a double tool, having two cutting tips; this presents the advantage of balancing the tool relatively to its axis 26, and also of reducing wear by dividing it evenly on the two "tips."

In the particular example shown in Figs. 1 and 2, the distance (31—21 in Fig. 2) between the two axes 21 and 26 is about the same as the radii R, R' of the cutter arcs 33, 34. In any event, the cutter axis 26 will generally be on the "inside" of the gear blank 20, that is to say, the axis 26 will be between the axis 21 and the tooth zone. The location of the axis is determined by rather intricate calculations, which I do not deem it necessary to reproduce here, these calculations depending on certain assumptions as to the desired form of teeth, the amount of addendum, and other factors. In the example shown, the axis 26 has been so located that the path of any point on the cutting edge, and consequently the (longitudinal) shape of the teeth, will be a curve approximating the involute of a circle whose center is on the axis 21 and whose plane is perpendicular to said axis. I desire it to be understood, however, that I do not restrict myself to this location of the cutter axis and to this particular form of teeth.

It will be understood that after a convex surface 38, a concave surface 37, and a bottom surface 36 have been produced in the above-described manner by rotating the cutter 32 about the axis 26 while the blank 20 is stationary, the blank will be brought to a new position relatively to the tool, or indexed, by giving the blank 20 the requisite angular movement or partial rotation about its axis 21, or, if preferred, effecting a corresponding shift of the cutter axis 26 around the blank axis 21. The construction of the machine for cutting the teeth of the "wheel" could be very simple, involving in principle nothing but a suitable support for the blank 20, coupled with suitable bearings for the axis or shaft 26 of the cutter 32, means (say, pulley and belt) for rotating the cutter about its axis, and "indexing" means applied either to said blank-support or to the bearings supporting the cutter.

As regards the several positions to which the cutter-axis may be indexed relatively to the blank (two of such positions being indicated in Fig. 2), it will be seen that in each of them the cutter axis 26 will be tangential to a circular cylinder co-axial with the gear, said cylinder being indicated in Fig. 2 by a circle 26'' having a radius of the length 21—31 and its center at 21. It will also be obvious that in each of its positions, the cutter axis 26 will form the same angle $b$ with the generatrix of the cylinder passing through the point of tangency of said axis 26 to said cylinder.

When the cutter has a plurality of "tips," as illustrated, said tips will preferably not only be located at the same distance from the cutter axis 26, but also at equal angular distances from each other; that is to say, with two cutter "tips," as shown, the angular distance between them would be 180°.

It will be obvious that the finished gear will have a set of alternate convex working surfaces of spherical curvature, and between them a set of alternate concave active tooth-surfaces of spherical curvature, each convex surface forming a pair with a concave surface (on an adjacent tooth), and the sphere-centers of the surfaces of the same pair lie in a "skew axis" corresponding to, or rather coinciding with, the position occupied by the cutter axis 26 at the time of shaping that particular pair of tooth-surfaces. The lines 26 of Fig. 2 may therefore be taken as representing not only two positions of the cutter axis, but also two "skew axes" which contain the centers of the spheres of which the convex and the concave working tooth-surfaces of the finished "wheel" form part.

As regards the bevel "pinion" which is to mesh with a "wheel" of the character set forth above, its working tooth-surfaces are produced by a rotary or oscillating cutter of the same character as the "wheel"-cutter, although differing therefrom in the particulars specified below. Instead of having the blank stationary relatively to the cutter-axis (as in the case of the "wheel") during the cutting of a pair of tooth-surfaces, I effect a relative rolling motion which varies the relative position of the cutter axis to the "pinion"-blank axis, in substantially the same manner in which the pinion will roll on the mating "wheel" when the two are in mesh. This operation is illustrated particularly by Figs. 5, 6 and 7, where the pinion-cutter 39 is shown as made with a convex cutting edge 40 curved according to the arc of a circle having its center 41 on the axis 42 about which said cutter is adapted to rotate, and with a concave cutting edge 43 curved according to the arc of a circle having its center 44 on said axis 42; furthermore, the cutter has a bottom edge 45 which may be perpendicular to the axis 42 (although this is not essential) to cut the bottom surface of the tooth space on the pinion. In practice, the cutter will have a plurality of cutter "tips" grouped around the cutter axis 42, preferably at equal angular distances from each other, and the individual "tips" or tools will preferably be mounted on a separate carrier 39' secured to the cutter shaft 42'. The portions of the tools lying in the rear of the cutting edges 40, 43, 45 will lie interiorly of the annular body swept out by the cutter, so as not to impede the cutting action; in fact, the chief difference between the pinion cutter and the wheel cutter is that the convex edge 33 of the wheel cutter has the same radius of curvature as the concave edge 43 of the pinion cutter, and the concave edge 34 of the wheel cutter has the same radius of curvature as the convex edge 40 of the pinion cutter. The distance between the two sphere-centers 29, 30 on the wheel-cutter axis will generally be slightly larger than the distance between the sphere-centers 41, 44 on the pinion-cutter axis. In their general formation, however, the two cutters are similar.

The machine for cutting the pinion tooth-surfaces may be constructed in various ways. For instance, the cutter shaft 42' might be journaled in stationary bearings 46, while the pinion blank 47 would be secured (detachably) to a shaft 48 mounted to turn in bearings 49. This bearing is secured to a suitable support 50 mounted to swing or rotate about an axis 51, forming about the same angle with the axis 48' of the shaft 48 and of its bearing 49 (and of the pinion blank 47), as the axes of the finished "wheel" and "pinion" will form with each other in the meshing position. Thus, in the case of a wheel and a pinion arranged to rotate about axes intersecting at a right angle to each other, the angle $d$ (Fig. 7) might be a few minutes of arc less than a right angle; a proper amount of backlash may be secured in this manner. The axis 51 may be considered as corresponding to the axis (21) of the "wheel" with which the "pinion" is in mesh, the pitch-cone of the blank 47 having its apex at the point where the axes 48', 51 intersect. This point, of course, would be also the apex of the pitch cone of the "wheel" with which said pinion is to mesh, if said wheel were in place. It is preferable for certain reasons (particularly simplicity of calculation) to have the axis 42 of the pinion cutter pass through the apex 52 of the back cone of the wheel, said apex lying on the axis 51. In order to produce the proper rolling motion of the pinion blank 47, I may, for instance, secure to the shaft 48 a wheel 53 whose teeth mesh with those of a stationary toothed ring 54 which may form part of the frame supporting the bearings 46. The number of teeth on the wheels or toothed rings 53, 54 will be the same (or at least in the same ratio) as the number of teeth on the finished pinion and wheel respectively. In operation, the support 50 would be swung so as to carry the pinion-blank 47 past the rapidly-rotating cutter 39, which, owing to the fact that the blank is at the same time revolved about its own axis 48′, will produce or generate on the pinion blank, working tooth-surfaces of a shape conjugate to the spherically-curved surfaces of the "wheel". An indexing device may be provided to enable the position of the cutter axis to be shifted circumferentially with respect to the axis 51. It will be understood that the rotation of the cutter 39 is at a much higher rate than that of the support 50, so that the distance traveled by the support 50 during a single "stroke" or "cut" of the tool will be practically negligible.

It will further be noted that the pinion cutter as well as the wheel cutter are male tools, which is an advantage as regards grinding the tool or otherwise keeping it in condition. The wheel cutter and the pinion cutter cut from opposite sides, the wheel cutter from above as indicated in Figs. 1 and 6, and the pinion cutter from below, as shown in Figs. 5 and 6, it being understood that Fig. 7 is inverted relatively to the showing in Figs. 5 and 6. The teeth of the wheel are of course tapering toward the wheel axis, see that portion of Fig. 2 at which two adjacent tooth-spaces are illustrated with the intervening tooth.

Fig. 6 illustrates the relation of the pinion cutter to the wheel cutter. The circular arc 57 indicates a great circle of the addendum sphere of the wheel, that is, a sphere the center of which is at the apex of the back cone of said wheel, and the radius of which is equal to the slant height of the back cone plus the addendum of the wheel teeth. The bottom-cutting edges 45 of the pinion cutter 39 are so arranged as to lie in a tangent to said great circle, the cutter-axis 42 being therefore perpendicular to said tangent. The center 44 of the concave edge 43 of the pinion cutter 39 coincides with the center 29 of the convex edge 33 of the wheel cutter 32. Through this center point passes also the axis 26 of the wheel cutter. Having decided upon the desired depth of teeth (addendum plus dedendum), a line 58 is drawn parallel to the above-mentioned tangent, at a distance $e$ equal to said tooth depth. This determines one of the bottom-cutting edges 35 of the wheel cutter 32, together with the apex 26* of the cone swept by said edge 35 during the revolution of the cutter. Fig. 6 also shows a number of successive indexed positions of both cutter axes. It will be seen that the pinion cutter simulates the tooth of the "wheel" not only as regards the contact surfaces thereof, but also (although to a lesser degree of precision) as regards the top or addendum boundary of the contact surfaces. The bottom of the cut in the wheel will be curved (conical) as indicated at 59 in Fig. 6, but the pinion blank may or may not be correspondingly curved, as shown at 60.

If desired, spur wheels and spur pinions mating therewith may be cut and generated in accordance with the same principles that have been set forth above in connection with bevel gears. The cutters may be of the same character as those described above, but the relation of their axes to those of the blanks will of course be different. Thus, in cutting the teeth of the (stationary) wheel blank 20′ (Fig. 8), the cutter will rotate about an axis 26‴ perpendicular to a plane containing the blank axis 21′; said axis 26‴ would preferably lie in a plane perpendicular to the blank axis 21′ midway between the end surfaces of the blank, so as to obtain teeth of a form which will eliminate end thrust.

For cutting the corresponding spur pinion, I might employ an arrangement such as indicated diagrammatically in Fig. 9, where the blank 47′ rolls slowly as of its pitch circle 47″ on the pitch line 39″ of a corresponding rack, while the tool 39 revolves rapidly about an axis 42″ in offset relation to said blank.

While I have emphasized the application of my invention to the cutting of a "wheel" with convex and concave tooth-surfaces of spherical curvature, and of a "pinion" with tooth-surfaces conjugate to such spherically-curved surfaces, my invention, considered in its broader aspects, includes the production of "wheels" with active tooth-surfaces curved in two intersecting directions, and particularly, in two directions intersecting at right angles, without being restricted to the specific case in which this curvature is spherical; it being understood that, in any event, the active tooth-surfaces of the pinion, are conjugate to those of the mating wheel. All of the active tooth-surfaces, that is, both the convex surfaces and the concave tooth-surfaces, form part of the same tooth-zone, or in other words, are located at the same distance from the axis of the gear.

I desire it to be understood that various modifications may be made without departing from the nature of my invention as set forth in the appended claims.

Gears constructed according to my invention in pairs of mating gears one of which has teeth with working surfaces of spherical curvature, and the other working tooth surfaces conjugate to such spherically-curved tooth surfaces, are not only produced in a very simple and accurate manner, as explained above, but offer special advantages in their operation. The teeth of both gear and pinion are tapered, and there is much greater freedom than with teeth of other forms, in choosing the curvature of the teeth both as regards the radius thereof and the location of its center.

I claim:

1. A gear having teeth with active surfaces of spherical curvature, the sphere-center of any one of said surfaces lying exteriorly of the tooth on which such surface is located.

2. A gear having teeth with spherically-curved active surfaces, of which alternate surfaces are convex and the others concave, the convex surfaces being located at the same distance from the axis of the gear as the concave surfaces.

3. A gear having teeth with spherically-curved active surfaces some of which are convex and the others concave, each concave surface having the same radius of curvature as the other concave surfaces, and each convex surface having the same radius of curvature as the other convex surfaces, the convex surfaces being located at the same distance from the axis of the gear as the concave surfaces.

4. A gear having teeth with spherically-curved active surfaces some of which are convex and the others concave, one active surface of each tooth being convex, and the other active surface of the same tooth being concave.

5. A gear having teeth with spherically-curved active surfaces some of which are convex and the others concave, one active surface at each tooth-space being convex, and the other active surface at the same tooth-space being concave.

6. A gear having teeth with spherically curved active surfaces some of which are convex and the others concave, said concave surfaces being at the same distance from the axis of the gear as said convex surfaces.

7. A gear having active tooth surfaces of spherical curvature, alternate tooth surfaces being convex, and the intervening ones concave, each convex surface forming a pair with one of the adjacent concave surfaces, all the lines which connect sphere centers belonging to tooth surfaces of the same pair, being tangential to the same cylinder co-axial with the gear.

8. A gear having active tooth surfaces of spherical curvature arranged in pairs, all the lines which connect sphere centers belonging to tooth surfaces of the same pair, being tangential to the same cylinder co-axial with the gear.

9. A bevel gear having teeth with sperically-curved active surfaces some of which are convex and the others concave, said concave surfaces being located at the same distance from the axis of the gear as said convex surfaces, the sphere-center of every convex surface being at the same distance from the axis of the gear as the sphere-centers of the other convex surfaces, and the sphere-center of each concave surface being at the same distance from the axis of the gear as the sphere-centers of the other concave surfaces.

10. A bevel gear having teeth with spherically-curved active surfaces arranged in pairs, one surface of each pair being convex and the other concave, the sphere-centers of the two surfaces of the same pair lying in an axis in skew relation to the axis of the gear.

11. A bevel gear having teeth with spherically-curved active surfaces arranged in pairs, one surface of each pair being convex and the other concave, the sphere-centers of the two surfaces of the same pair lying in an axis in skew relation to the axis of the gear, all the skew axes of the several pairs being tangential to a circular cylinder co-axial with the gear, and forming the same angle with the generatrices of such cylinder at the respective points of tangency.

12. A bevel gear having teeth with spherically-curved active surfaces arranged in pairs, one surface of each pair being convex and the other concave, the sphere-centers of the several convex surfaces being equidistant from the axis of the gear, and the sphere-centers of the several concave surfaces being likewise equidistant from the axis of the gear, but farther away therefrom than the sphere-centers of the convex surfaces.

13. A bevel gear having teeth with spherically-curved active surfaces arranged in pairs, one surface of each pair being convex and the other concave, the sphere-centers of the several convex surfaces being equidistant from the axis of the gear and the sphere-centers of the several concave surfaces being likewise equidistant from the axis of the gear, the sphere-centers of the two active surfaces of the same pair lying on an axis in skew relation to the axis of the gear, the skew axes of the several pairs being tangential to a circular cylinder co-axial with the gear, and forming equal angles with the generatrices of such cylinder at the respective points of tangency.

14. A bevel gear having teeth with spherically-curved active surfaces arranged in pairs, one surface of each pair being convex and the other concave, the sphere-centers of the two surfaces of the same pair lying on an axis which passes between the tooth-zone of the gear and the axis of said gear.

15. A gear having teeth with active surfaces curved in two intersecting directions, one half of said surfaces being convex in both directions, and the others concave in both directions, all of said surfaces being located at the same distance from the axis of the gear.

16. A gear having teeth with active surfaces curved in two intersecting directions, alternate surfaces being convex in both directions, and the others concave in both directions, all of said surfaces being located at the same distance from the axis of the gear.

17. A gear having teeth with active surfaces curved in two directions intersecting at right angles, some of said tooth surfaces being convex in both directions, and the others concave in both directions, all of said surfaces being located at the same distance from the axis of the gear.

18. A gear each tooth of which has two active surfaces located at the same distance from the axis of the gear and curved in two intersecting directions, one of said surfaces being convex in both directions, and the other concave in both directions.

19. A toothed gear each tooth-space of which is bounded by two active tooth-surfaces located at the same distance from the axis of the gear and curved in two intersecting directions, one of said surfaces being convex in both directions, and the other concave in both directions.

In testimony whereof, I have signed this specification.

HARVEY D. WILLIAMS.